US012539360B2

(12) United States Patent
Loomis et al.

(10) Patent No.: US 12,539,360 B2
(45) Date of Patent: Feb. 3, 2026

(54) LATCH FOR CAPTURING AND SECURING A CASSETTE TO A MEDICAL DEVICE

(71) Applicant: B. Braun Medical Inc., Bethlehem, PA (US)

(72) Inventors: Benjamin Loomis, Topton, PA (US); Elisha James Endres, Bethlehem, PA (US)

(73) Assignee: B. BRAUN MEDICAL INC., Bethlehem, PA (US)

( * ) Notice: Subject to any disclaimer, the term of this patent is extended or adjusted under 35 U.S.C. 154(b) by 560 days.

(21) Appl. No.: 18/116,674

(22) Filed: Mar. 2, 2023

(65) Prior Publication Data
US 2024/0293609 A1    Sep. 5, 2024

(51) Int. Cl.
| | |
|---|---|
| *A61M 5/142* | (2006.01) |
| *F04B 43/08* | (2006.01) |
| *F16B 2/02* | (2006.01) |

(52) U.S. Cl.
CPC .............. *A61M 5/142* (2013.01); *F04B 43/08* (2013.01); *F16B 2/02* (2013.01); *A61M 2205/3317* (2013.01)

(58) Field of Classification Search
CPC .............. A61M 5/142; A61M 5/14232; A61M 5/14228; A61M 2205/12; A61M 2205/14; A61M 2205/121; A61M 2205/3317; A61M 2205/128; A61M 2205/6045; F04B 43/08; F16B 2/02
See application file for complete search history.

(56) References Cited

U.S. PATENT DOCUMENTS

| | | | |
|---|---|---|---|
| 3,145,050 | A | 8/1964 | Edwards |
| 4,743,052 | A | 5/1988 | Stammreich et al. |
| 5,647,854 | A | 7/1997 | Olsen et al. |
| 5,755,691 | A | 5/1998 | Hilborne |
| 6,629,955 | B2 | 10/2003 | Morris et al. |
| 7,238,010 | B2 | 7/2007 | Hershberger et al. |

(Continued)

FOREIGN PATENT DOCUMENTS

| | | |
|---|---|---|
| EP | 1335089 A1 | 8/2003 |
| WO | 2020178825 A1 | 9/2020 |
| WO | 2022119837 A3 | 7/2022 |

OTHER PUBLICATIONS

International Search Report and Written Opinion for International Application No. PCT/US2024/013296, dated May 24, 2024 (May 24, 2024)—16 pages.

*Primary Examiner* — William H Rodriguez
(74) *Attorney, Agent, or Firm* — CM Law PLLC; Stephen J. Weed

(57) ABSTRACT

Systems and devices for controlling the delivery of a fluid are described. A latch assembly for guiding a cassette into the recess of an infusion pump housing includes a rotatable actuator connected to a movable latch. The movable latch includes one or more latch prongs that engage with the cassette. As the actuator is rotated toward its closed position, the latch prongs guide the cassette into the recess. A spring-biased release assembly holds the latch assembly closed and facilitates a secure engagement between the cassette and the recess, thereby holding the flexible tubing within the cassette in a secure engagement with the infusion pump. The latch assembly includes a magnet and a sensor in the pump housing to detect whether the latch assembly is closed.

20 Claims, 5 Drawing Sheets

(56) References Cited

U.S. PATENT DOCUMENTS

| | | |
|---|---|---|
| 7,632,079 B2 | 12/2009 | Hershberger et al. |
| 7,967,773 B2 | 6/2011 | Amborn et al. |
| 8,552,880 B2 | 10/2013 | Kopp et al. |
| 8,974,415 B2 | 3/2015 | Robert et al. |
| 9,121,403 B2 | 9/2015 | Lanigan et al. |
| 10,130,755 B2 | 11/2018 | Anderson et al. |
| 10,213,546 B2 | 2/2019 | Anderson et al. |
| 10,232,111 B2 | 3/2019 | Anderson et al. |
| 10,489,617 B2 | 11/2019 | Salem et al. |
| 11,213,460 B2 | 1/2022 | O'Keefe et al. |
| 11,392,781 B2 | 7/2022 | Salem et al. |
| 2015/0182689 A1 | 7/2015 | Dhami |
| 2015/0184648 A1* | 7/2015 | Dhami ................ F04B 43/082 417/474 |
| 2017/0165414 A1* | 6/2017 | Schieve ................ A61M 5/142 |
| 2019/0143034 A1 | 5/2019 | Anderson et al. |
| 2020/0057874 A1 | 2/2020 | Salem et al. |
| 2020/0147303 A1 | 5/2020 | Lee |
| 2020/0179592 A1 | 6/2020 | Adams et al. |
| 2021/0353507 A1 | 11/2021 | O'Keefe et al. |
| 2022/0040403 A1 | 2/2022 | Yachnis et al. |

\* cited by examiner

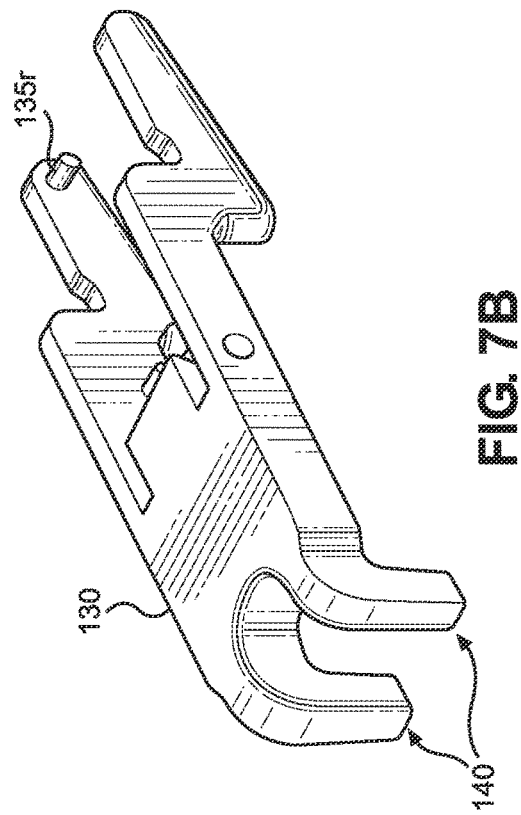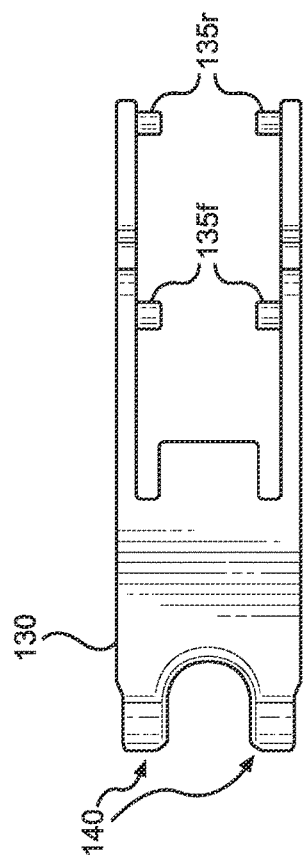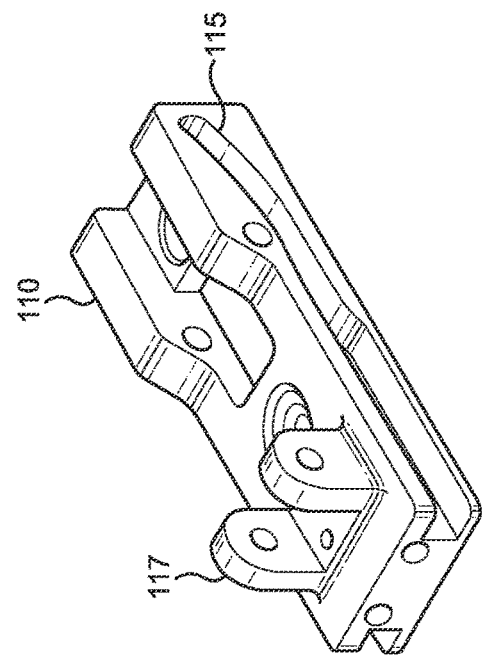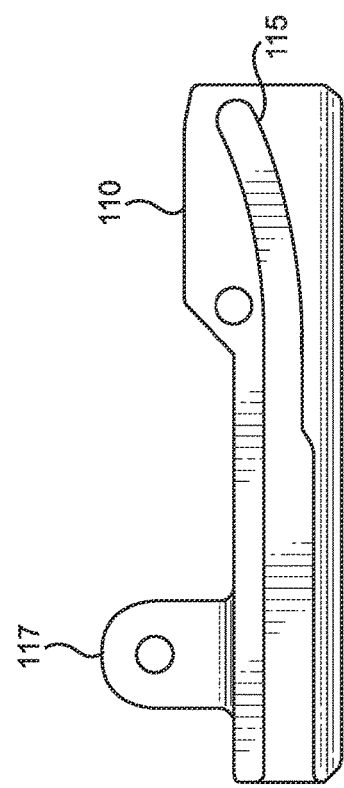

LATCH FOR CAPTURING AND SECURING A CASSETTE TO A MEDICAL DEVICE

TECHNICAL FIELD

Examples set forth in the present disclosure relate to the field of medical devices, such as devices for delivering a beneficial agent or fluid to a patient. More particularly, but not by way of limitation, the present disclosure describes a latch assembly for capturing and securing a cassette to an infusion pump.

BACKGROUND

Infusion pumps deliver controlled doses of beneficial agents in fluid form, such as medications, analgesics, and nutrition to patients. Infusion pumps are particularly well suited to delivering controlled doses of fluids from a bottle or bag, through flexible tubing, and into a patient over a relatively long period (e.g., several hours or longer). Various types of fluid delivery systems are in use, including vacuum-driven systems and devices that use a pump. For example, a peristaltic infusion pump includes a rotor assembly or other element that exerts a force on the flexible tubing, thereby driving the fluid into the patient at a controlled rate.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added upper or lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 7A is a top view of an example movable latch;

FIG. 7B is a perspective view of the example movable latch of FIG. 7A;

FIG. 8A is a side view of an example base; and

FIG. 8B is a perspective view of the example base of FIG. 8A.

DETAILED DESCRIPTION

Figure 2:
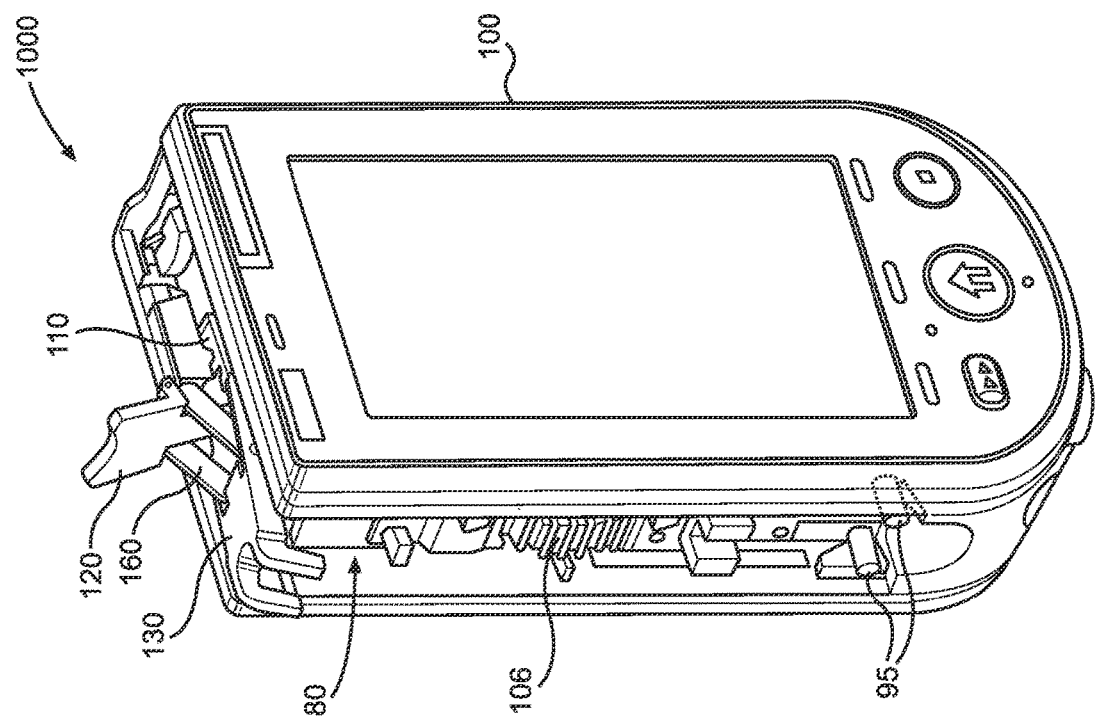
FIG. 2 is a perspective view of an example infusion pump housing and a latch assembly.

Various implementations and details are described with reference to example latch assemblies for cassettes and infusion pumps. In an example implementation, a latch assembly for guiding a cassette into the recess of an infusion pump housing includes a rotatable actuator connected to a movable latch. The movable latch includes one or more latch prongs that are sized and shaped to engage with an edge of the cassette, which supports a flexible tubing. As the actuator is rotated toward the closed position, the latch prongs guide the cassette into the recess. A spring-biased release assembly holds the latch assembly closed and facilitates a secure engagement between the flexible tubing and the infusion pump. The example assembly in some implementations includes a magnet that is positioned such that a sensor in the pump housing detects whether the actuator is closed.

The following detailed description includes assemblies, systems, methods, and techniques to illustrate the examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The term "proximal" or "proximate" is used to describe an item or part of an item that is situated near, adjacent, or next to an object or person; or that is closer relative to other parts of the item or part, which may be described as "distal." For example, the end of an item nearest an object may be referred to as the proximal end, whereas the generally opposing end may be referred to as the distal end.

The orientations of the pump housing, cassette, tubing, and associated components as shown in any of the drawings are given by way of example only, for illustration and discussion purposes. For example, in operation, a pump housing may be oriented as shown or in any other orientation that is suitable to a particular application. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any component described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The systems, devices, and methods described herein can be used to delivery any of a variety of therapeutic fluids or beneficial agents (e.g., a fluid, liquid, or gel) from a fluid reservoir, such as a bottle or bag, through a conduit (e.g., flexible tubing), and into a patient or user.

Figure 1:
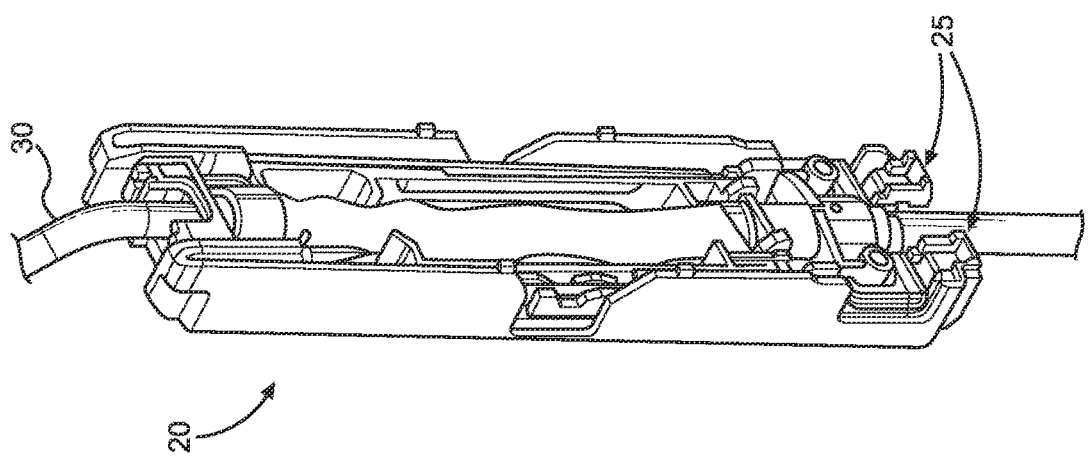
FIG. 1 is a perspective view of an example cassette supporting flexible tubing.

FIG. 1 is a perspective view of an example cassette 20 supporting a length of flexible tubing 30. In some implementations, the tubing 30 passes through and is supported by one or more elements on the interior of the cassette 20.

FIG. 2 is a perspective view of an example infusion pump housing 100 and a latch assembly 1000. In some implementations, as shown, the housing 100 supports a pump 106 located proximate a recess 80. As described herein, the latch assembly 1000 guides the cassette 20 into the recess 80, such that the tubing 30 is placed into secure engagement with the pump 106. When securely engaged, the pump 106 (e.g., a peristaltic infusion pump) exerts a force on the flexible tubing 30, thereby delivering a measured dosage of fluid through the tubing 30 (e.g., from a bottle or bag and into a patient) at a controlled delivery rate (e.g., a particular volume during a set duration, such as one milliliter per minute).

The latch assembly 1000 in some implementations includes a base 110 and an actuator 120 connected by a linkage 160 to a movable latch 130.

The infusion pump housing 100, in some implementations, defines a recess 80 that is sized and shaped to releasably receive a cassette 20. The housing 100, as shown in FIG. 2, includes a pair of prongs 95 located proximate the recess 80. In some implementations, the prongs 95 are sized and shaped to releasably engage with a pair of seats 25 on the cassette 20 (as shown in FIG. 1). In this aspect, the seats 25 and the prongs 95 cooperate to align the cassette 20 relative to the recess 80. The seats 25 are sized and shaped to releasably receive the prongs 95 in a relatively loose engagement, such that the pair of prongs 95 act as a hinge for the cassette 20. For example, when the seats 25 of the cassette 20 are placed against the prongs 95, the cassette 20 may rotate into the recess 80, as illustrated schematically in FIG. 3 and FIG. 4.

Figure 3:
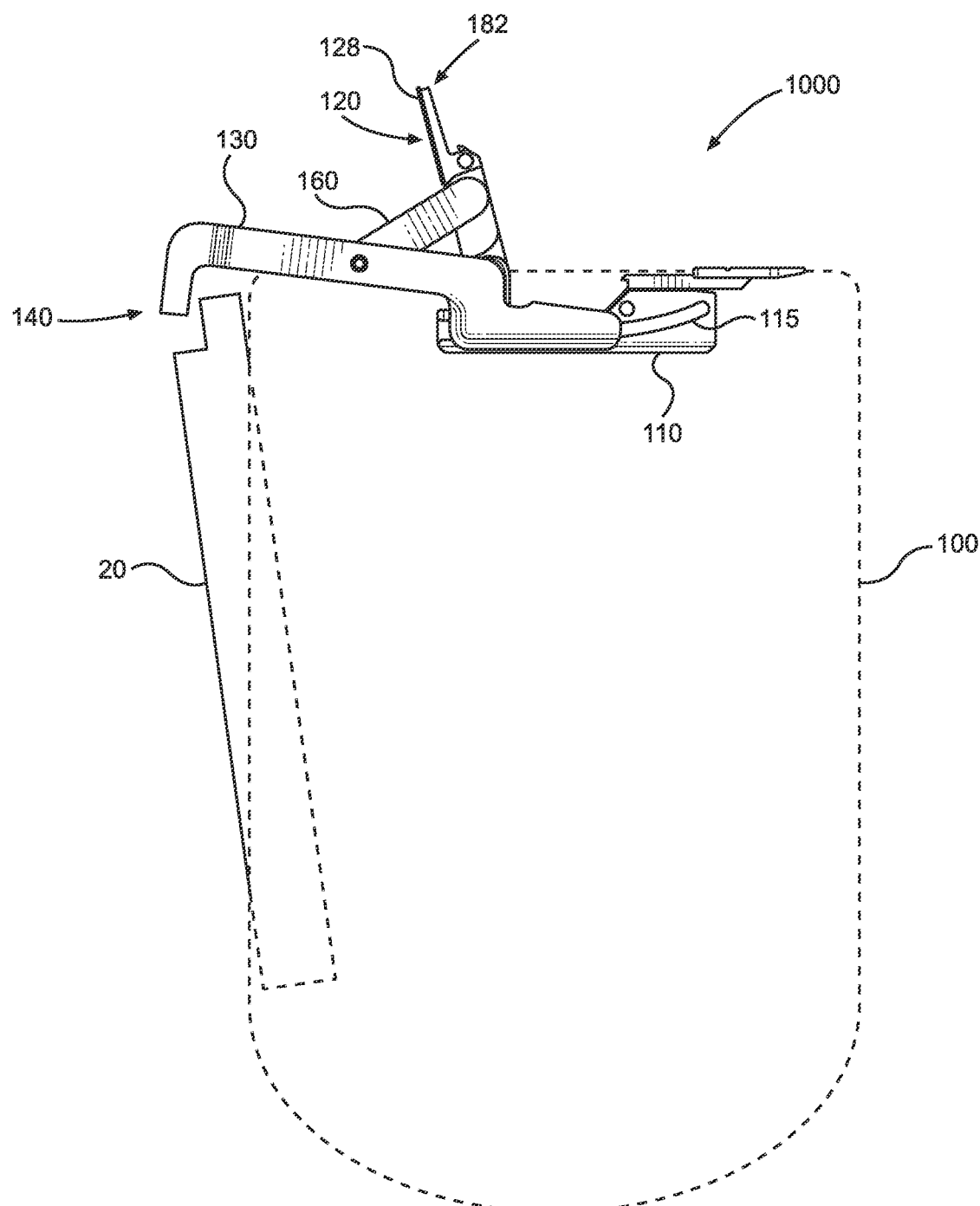
FIG. 3 is a diagrammatic view of an example latch assembly in an open position, a cassette, and an infusion pump housing.

FIG. 3 is a diagrammatic view of an example latch assembly 1000 in an open position 182, a cassette 20, and an infusion pump housing 100. In some implementations the base 110 is supported by or connected to the housing 100 and the base 110 includes a pair of tracks 115, a portion of which can be seen in FIG. 3. The actuator 120 extends from a hinge end 122 (shown in FIG. 6) to an opposing free end 128. In this aspect, a portion of the actuator 120 proximate the free end 128 is useful as a handle for a user to manipulate the actuator 120. The actuator 120 is rotatable from an open position 182 (shown in FIG. 3) to a closed position 184 (shown in FIG. 4). The actuator 120 in some implementations is connected by a linkage 160 to a movable latch 130.

The movable latch 130, as described herein, includes two or more pins 135 (shown in FIG. 7A). In some implementations, the pins 135 are sized and shaped to slidably engage with the pair of tracks 115 in the base 110. In this aspect, the pins 135 move along and otherwise cooperate with the tracks 115 to constrain the motion of the movable latch 130 relative to the base 110 and the pump housing 100. In this aspect, the pins 135 and tracks 115 constrain the motion of the movable latch 130 by inhibiting movement in a lateral direction relative to the path defined by the tracks 115.

The movable latch 130, as shown, includes one or more latch prongs 140. The latch prongs 140 are sized and shaped to capture or otherwise engage with a portion of the cassette 20. In some implementations, the latch prongs 140 are part of a U-shaped opening in the movable latch 130 through which the flexible tubing 30 passes. When the actuator 120 is in the open position 182, as shown in FIG. 3, the movable latch 130 is oriented in a raised position relative to the base 110, such that the latch prongs 140 are located away from the recess 80, allowing space for the cassette 20 to be manually placed between the latch prongs 140 and the recess 80.

Relative to the view shown in FIG. 3, when the actuator 120 is rotated clockwise, the linkage 160 moves the movable latch 130 toward the right. The pins 135 on the latch 130 slide within and along the tracks 115 in the base 110. The latch prongs 140 capture and guide the cassette 20 into the recess 80.

Figure 4:
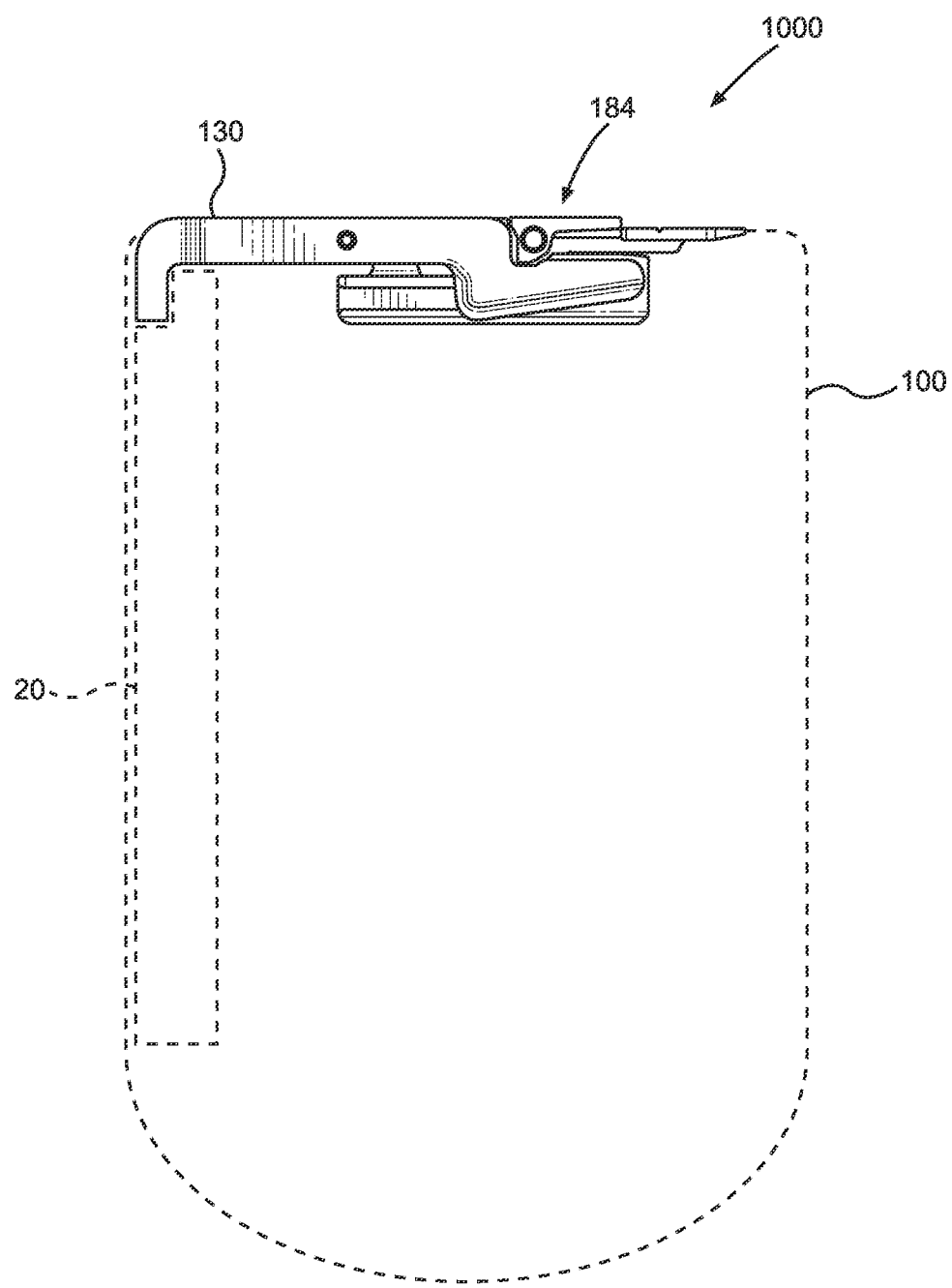
FIG. 4 is a diagrammatic view of the example latch assembly of FIG. 3 in a closed position relative to the example cassette and the infusion pump housing.
Figure 5:
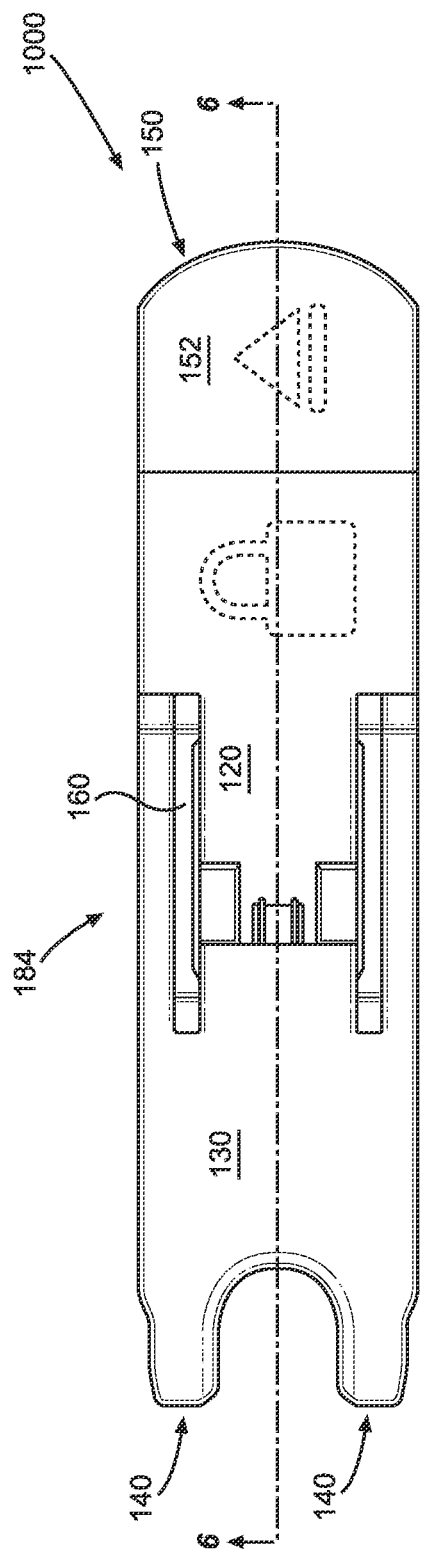
FIG. 5 is a top view of an example latch assembly.

FIG. 4 is a diagrammatic view of the example latch assembly 1000 of FIG. 3 in a closed position 184 relative to the example cassette 20 and the infusion pump housing 100. FIG. 5 is a top view of an example latch assembly 1000 in a closed position 184. In some implementations the linkage 160 includes a pair of links pivotably connecting the actuator 120 to the movable latch 130, as shown in FIG. 2. The latch assembly 1000 in some implementations includes a release assembly 150 including a lever 152, as shown.

The example actuator 120 includes an icon or other indicia (e.g., a padlock icon, as shown) suggesting to users that pressing the actuator 120 will facilitate locking or closure of the latch assembly 1000. Similarly, the lever 152 of the release assembly 150 includes indicia (e.g., an arrow icon, as shown) suggesting to users that pressing the lever 152 will unlock or otherwise release the latch assembly 1000.

Figure 6:
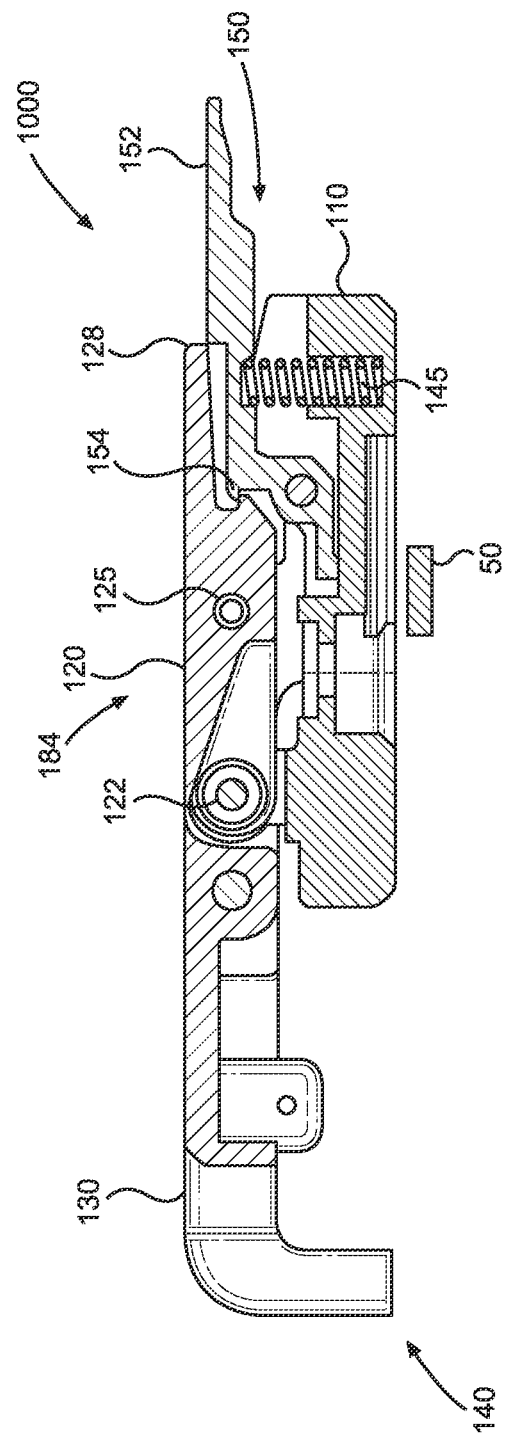
FIG. 6 is a sectional view of the example latch assembly of FIG. 5.

FIG. 6 is a sectional view of the example latch assembly 1000 of FIG. 5. The release assembly 150 includes a lever 152 pivotably mounted to the base 110 and a spring 145. The spring 145 in some implementations is biased toward opening the lever 152. When the actuator 120 is closed, the spring-biased release assembly 150 holds the latch assembly 1000 closed and facilitates a secure engagement between the cassette 20 and the recess 80 in the housing 100, thereby securing the flexible tubing 30 against the infusion pump 106.

The lever 152 includes a catch surface 154 that is sized and shaped to engage with the actuator 120. In some implementations, as shown in FIG. 6, the catch surface 154 includes a protruding ridge along the width of the lever 152, which engages with a corresponding shelf or ledge that extends along the width of the actuator 120. The spring 145 and the catch surface 154 cooperate to inhibit unintended release of the actuator 120. In this aspect, when the catch surface 154 is engaged with the actuator 120, the spring 145 helps to maintain such engagement and the actuator 120 remains closed until a sufficient force is exerted on the lever 152.

In another aspect, the spring 145 and catch surface 154 cooperate to facilitate a quick release of the actuator 120 and to initiate a disengagement of the cassette 20 from the recess 80. When a pushing force is exerted on the lever 152 which is sufficient to overcome the force of the spring 145, the catch surface 154 disengages from the actuator 120 and the spring 145 urges the actuator 120 toward an upward or open position. As the actuator 120 opens, the movable latch 130 moves relative to the base 110 (e.g., the pins 135 move along the tracks 115). As the movable latch 130 opens, the cassette 20 is no longer held within the recess 80. Additional opening of the actuator 120 in the counterclockwise direction (e.g., relative to the view in FIG. 3) causes further movement of the movable latch 130 and a lifting or opening of the latch prongs 140, thereby facilitating a release of the cassette 20 for easy removal.

As shown in FIG. 6, the movable latch 130, the linkage 160, and the actuator 120 are arranged such that the outer or upper surface of the latch assembly 1000 is relatively flat when the actuator 120 is in the closed position 184. For example, the actuator 120 defines one or more openings for receiving the linkage 160 and the movable latch 130. In this aspect, the elements along the upper surface of the latch assembly 1000 in some implementations are generally but not precisely coplanar when the actuator 120 is in the closed position 184. In this aspect, the movable latch 130, the linkage 160, the actuator 120, and the support 117 for the actuator 120 are sized and shaped to releasably fit together and relative to one another in a nesting arrangement.

The actuator 120 in some implementations includes a magnet 125 that is positioned relative to a sensor 50 located in the housing 100 or in the base 110, such that the sensor 50 detects whether the actuator 120 is in the closed position 184. The sensor 50 in some implementations is a Hall-effect proximity sensor that detects the presence or magnitude of a magnetic field. The output voltage of a Hall-effect sensor is directly proportional to the strength of the magnetic field. In use, the closer the magnet 125 is to the sensor 50, the stronger the field, and the higher the output voltage. A voltage-based signal from the sensor 50 in some implementations is useful in controlling operation of the pump 106 and other components in response to the relative positions and conditions of the latch assembly 1000 and the cassette 20.

FIG. 7A is a top view of an example movable latch 130. The pins 135 in some implementations include a fore pair of pins 135f and a rear pair of pins 135r. The rear pair of pins 135r in this example are positioned proximate the free end of the movable latch 130 and are oriented along the same lateral axis. The fore pair of pins 135f are positioned at an intermediate location and are likewise in coaxial alignment. Each pair of pins is sized in diameter to closely and slidably engage with the pair of tracks 115 in the base 110; and sized in length to be securely seated within the tracks 115 without interfering with other parts of the latch assembly 1000. The two pairs of pins 135f, 135r cooperate to constrain the motion of the movable latch 130 within and along the pair of tracks 115. FIG. 7B is a perspective view of the example movable latch 130 of FIG. 7A.

FIG. 8A is a side view of an example base 110. The base 110 includes a support 117 for pivotably connecting the actuator 120 to the base 110. The pair of tracks 115 are sized and shaped to slidably receive and engage with the one or more pins 135, as described herein.

In a related aspect, the pair of tracks 115 are sized and oriented along the base 110 to constrain the motion of the pins 135 and the movable latch 130 relative to the base 110 by inhibiting movement in a lateral direction relative to the path defined by the tracks 115. For example, in some implementations, as shown in FIG. 8A and FIG. 8B, the tracks 115 are oriented along and generally parallel to a lengthwise axis (e.g., in an X-direction) of the base 110. This orientation of the tracks 115 constrains the movable latch 130 to movement primarily in the X-direction, inhibiting movement in a lateral direction (e.g., in the Y-direction).

Moreover, as described herein, the latch assembly 1000 when closed holds the cassette 20 in the recess 80 and thereby facilitates a secure engagement between the flexible tubing 30 and the infusion pump 106. Some existing latch designs allow the cassette 20 to shift or 'walk' in a lateral direction, leading to an accidental disconnect between the tubing 30 and the pump 106. When the latch assembly 1000 described herein is closed, the orientation of the tracks 115 along the X-direction inhibits unintended lateral movement of the various components of the latch assembly 1000 in the Y-direction, and thereby inhibits unintended lateral movement (e.g., shifting or 'walking') of the cassette 20 within the recess 80, which helps to prevent an accidental disconnect between the tubing 30 and the pump 106.

As shown in FIG. 8A, the pair of tracks 115 in some implementations includes a forward portion for receiving and guiding the fore pair of pins 135f and a rearward portion for receiving and guiding the rear pair of pins 135r. Each portion is sized to closely and slidably receive the corresponding pair of pins. In the example shown, the forward portion is generally linear and larger relative to the rearward portion. The rearward portion of the tracks 115 in this example has a curved shape that guides the rear pair of pins 135r and the free end of the movable latch 130 upward, thereby driving the latch prongs 140 at the opposing end downward. FIG. 8B is a perspective view of the example base 110 of FIG. 8A.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An infusion pump comprising:
    a housing defining a recess for releasably receiving a cassette; and
    a latch assembly supported by the housing, the latch assembly comprising:
        a base comprising a pair of tracks;
        an actuator extending from a hinge end rotatably mounted to the base to an opposing free end, wherein the actuator is rotatable from an open position to a closed position; and
        a movable latch connected to the actuator and comprising two or more pins sized and shaped to slidably engage with the pair of tracks, and further comprising one or more latch prongs sized and shaped to engage with the cassette;
        wherein the pair of tracks cooperate with the two or more pins to constrain motion of the movable latch relative to the housing, such that the one or more latch prongs guide the cassette into the recess.

2. The infusion pump of claim 1, wherein the housing supports a pump proximate the recess,
    wherein the cassette supports a flexible tubing as a conduit for a fluid, and
    wherein the actuator in the closed position places the flexible tubing into secure engagement with the pump.

3. The infusion pump of claim 1, further comprising:
    a release assembly comprising a lever pivotably mounted to the base and a spring mechanically coupled between the lever and the base,
    wherein the lever comprises a catch surface sized and shaped to engage with the actuator, such that the spring and the catch surface cooperate to inhibit unintended release of the actuator, thereby releasably securing the cassette within the recess.

4. The infusion pump of claim 3, wherein the catch surface is sized and shaped to selectively disengage with the actuator in response to a force sufficient to pivot the lever, such that the spring facilitates release of the actuator toward the open position, thereby moving the movable latch and initiating a release of the cassette from the recess.

5. The infusion pump of claim 1, wherein the housing further comprises a pair of prongs proximate the recess, and
    wherein the cassette further comprises a pair of seats sized and shaped to releasably engage with the pair of prongs, such that the seats and prongs when so engaged cooperate to align the cassette relative to the recess.

6. The infusion pump of claim 1, further comprising:
    a magnet positioned relative to a sensor capable of detecting a magnetic field.

7. The infusion pump of claim 6, wherein the magnet is located in the actuator, such that the sensor detects whether the actuator is in the closed position.

8. The infusion pump of claim 1, wherein the two or more pins comprises a fore pair of pins and a rear pair of pins, and wherein the pair of tracks is sized and shaped to slidably receive the two pairs of pins and constrain motion of the movable latch relative to the housing.

9. The infusion pump of claim 1, further comprising:
    a linkage pivotably connecting the movable latch to the actuator; and
    a support for pivotably connecting the actuator to the base, wherein the support for the actuator and the pins on the movable latch cooperate to constrain motion of the movable latch relative to the base.

10. The infusion pump of claim 9, wherein the linkage, the support, the movable latch, and the actuator are sized and shaped to releasably fit together in a nesting arrangement.

11. A latch assembly supported by a housing defining a recess for releasably receiving a cassette, the latch assembly comprising:
    a base comprising a pair of tracks;
    an actuator extending from a hinge end rotatably mounted to the base to an opposing free end, wherein the actuator is rotatable from an open position to a closed position; and
    a movable latch connected to the actuator and comprising two or more pins sized and shaped to slidably engage with the pair of tracks, and further comprising one or more latch prongs sized and shaped to engage with the cassette,
    wherein the pair of tracks cooperate with the two or more pins to constrain motion of the movable latch relative to the housing, such that the one or more latch prongs guide the cassette into the recess.

12. The latch assembly of claim 11, wherein the housing supports a pump proximate the recess,
    wherein the cassette supports a flexible tubing as a conduit for a fluid, and
    wherein the actuator in the closed position places the flexible tubing into secure engagement with the pump.

13. The latch assembly of claim 11, further comprising:
    a release assembly comprising a lever pivotably mounted to the base and a spring mechanically coupled between the lever and the base,
    wherein the lever comprises a catch surface sized and shaped to engage with the actuator, such that the spring and the catch surface cooperate to inhibit unintended release of the actuator, thereby releasably securing the cassette within the recess.

14. The latch assembly of claim 13, wherein the catch surface is sized and shaped to selectively disengage with the actuator in response to a force sufficient to pivot the lever, such that the spring facilitates release of the actuator toward the open position, thereby moving the movable latch and initiating a release of the cassette from the recess.

15. The latch assembly of claim 11, wherein the housing further comprises a pair of prongs proximate the recess, and
    wherein the cassette further comprises a pair of seats sized and shaped to releasably engage with the pair of prongs, such that the seats and prongs when so engaged cooperate to align the cassette relative to the recess.

16. The latch assembly of claim 11, further comprising:
    a magnet positioned relative to a sensor capable of detecting a magnetic field.

17. The latch assembly of claim 16, wherein the magnet is located in the actuator, such that the sensor detects whether the actuator is in the closed position.

18. The latch assembly of claim 11, wherein the two or more pins comprises a fore pair of pins and a rear pair of pins, and wherein the pair of tracks is sized and shaped to slidably receive the two pairs of pins and constrain motion of the movable latch relative to the housing.

19. The latch assembly of claim 11, further comprising:
a linkage pivotably connecting the movable latch to the actuator; and
a support for pivotably connecting the actuator to the base, wherein the support for the actuator and the pins on the movable latch cooperate to constrain motion of the movable latch relative to the base.

20. The latch assembly of claim 19, wherein the linkage, the support, the movable latch, and the actuator are sized and shaped to releasably fit together in a nesting arrangement.

* * * * *